July 27, 1926.

C. W. AVERY ET AL 1,593,997

GLASS MACHINERY

Filed Feb. 24, 1922

WITNESS:
John M. Cahill.

INVENTOR.
C W Avery
W G Vesey
BY
E L Davis
ATTORNEY

July 27, 1926.

C. W. AVERY ET AL

GLASS MACHINERY

Filed Feb. 24, 1922

WITNESS:

John M. Cahill

INVENTOR.
C W Avery
BY W. G. Vesey
E L Davis
ATTORNEY

Patented July 27, 1926.

1,593,997

UNITED STATES PATENT OFFICE.

CLARENCE W. AVERY AND WENZEL G. VESEY, OF DETROIT, MICHIGAN, ASSIGNORS TO FORD MOTOR COMPANY, OF DETROIT, MICHIGAN, A CORPORATION OF DELAWARE.

GLASS MACHINERY.

Application filed February 24, 1922. Serial No. 538,994.

The object of our invention is to provide new and useful machinery for the manufacture of glass, of simple, durable, and inexpensive construction.

A further object of our invention is to provide glass and polishing machinery wherein the glass may be passed continuously beneath a battery of successive grinders and polishers thereby producing finished glass continuously.

A further object of our invention is to provide means in connection with the individual elements or units of such a battery of grinding or polishing devices for insuring a uniform action upon the glass from each unit, so that the resulting action of the battery will be uniform, thereby producing continuously glass of uniform finish.

A further object of our invention is to provide, in connection with a moving table and a battery of finishing units associated therewith, means sensitive to the work done by each unit so that such means may automatically control the power supplied to that unit thereby automatically maintaining the work done by such unit to a substantially constant amount.

A further object of our invention is to provide, in combination with a grinding or polishing unit, means for automatically varying the action of the unit on the glass as the load on the unit driving means varies.

Still a further object of our invention is to provide, in combination with a polishing unit, means for varying the consistency or effect of the abrasive used therewith, thereby automatically varying the load on the unit driving means.

With these and other objects in view, our invention consists in the arrangement, combination, and construction of the various parts of our improved device, as described in the specification, claimed in our claims, and shown in the accompanying drawings, in which:

Figure 1:
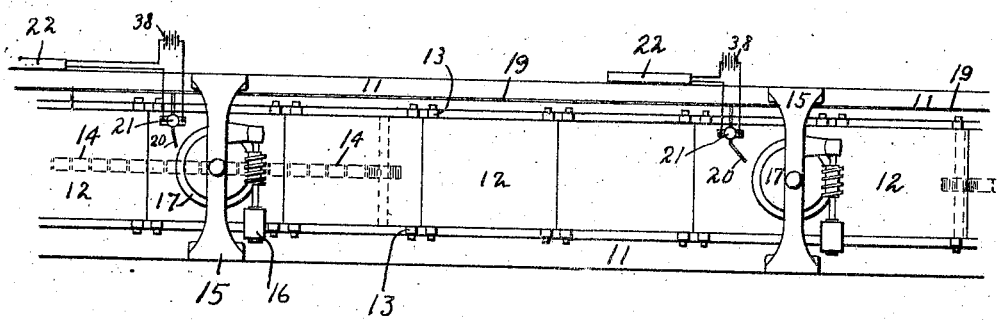
Figure 1 illustrates a top or plan view of a portion of an organism for grinding or polishing glass, the illustration here used being that of a polishing line, only two of the units or polishing heads being shown as that number sufficiently serves to illustrate our invention.
Figure 2:
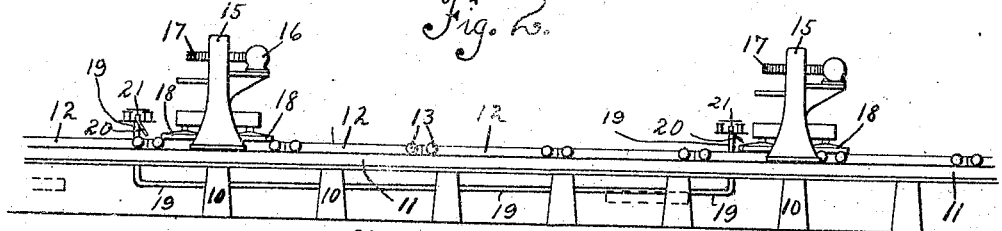
Figure 2 shows a side elevation of the assembly shown in Figure 1.

Referring to the accompanying drawings, we have used the reference numeral 10 to indicate, generally, the plurality of successive supports upon which is laid a track 11 which in turn carries a plurality of moving tables 12 which are designed to be forced along the track 11 on rollers 13 by any suitable source of power, as, for instance, a chain indicated by the dotted lines 14 may co-act with lugs extending from the bottom of the tables 12 to force the tables along the tracks; the chain 14 may be in turn driven by any suitable source of power which is not, however, here shown as same forms no part of our invention in so far as it is necessary that some force be used to move the tables 12 continuously along the tracks 11.

Disposed at intervals along the tracks 11 are a plurality of grinding or polishing heads formed with yokes 15 designed to carry motors 16 which in turn drive gear wheels 17. These latter in turn are connected with polishing or grinding pads 18 which are carried by the yokes 15 and rest, or are pressed, on the tables or platens 12. Mounted on the platens or tables 12 in any suitable manner, as by being set in plaster, are plates of rough glass whereby when the platens 12 are forced along the track 11 then the polishing pads 18 may contact with the upper surface of the glass to polish same. It will be understood in this connection that we have here shown and illustrated more particularly a device for polishing glass which has already been ground but that our invention is not limited to that feature or element and may be extended to similar means for regulating the units of grinding apparatus.

It will be understood that where such heads or units are used in connection with the polishing of glass which has already been ground, then that this polishing is accomplished by the rubbing of felt or other suitable pads 18 over the surface of the glass which has been coated with rouge. The rouge used for this process consists simply of iron oxide mixed with water and of a suitable consistency, the latter determining the effect of the polishing pads on the surface of the glass, that is, the amount and thickness or fluidity of the rouge controls the action of the pads on the surface of the glass assuming all other features, such as speed or the like, are equal. It will also be understood that where a battery of polishers is used on the glass so that it can be passed successively beneath the various heads of the battery then that the glass becomes heated due to the polishing action of these heads to a certain extent, depending upon the effectiveness of the polishing devices on the surface of the glass which in turn is regulated by the consistency of the rouge on the surface of the glass. If this heat imparted to the glass is not uniform or substantially uniform it will be seen that any strains in the glass and expansion thereof, due to unequal heating of the glass, is very likely to cause a considerable per cent of breakage. In fact our invention when installed upon such a glass grinding device has largely decreased the breakage of the glass due to these changes in temperature. Moreover, if the polishing heads of the battery do not each act with substantially the same effect and maximum efficiency upon the glass passing therebeneath it will be seen that the efficiency of the polishing heads will be diminished and the quality of the glass produced will be affected, or the quantity varied.

We accomplish the regulation of the work done by each polishing unit by automatically varying the fluidity or consistency of the rouge directly in proportion to the load on the driving means for the polishing pads. One form of accomplishing this result is illustrated in the accompanying drawings wherein a feed line 19 extends along the tracks 11 and is tapped adjacent to each polishing head so that a nozzle 20 may be supplied with water from the feed line 19. An electrically operated valve 21 controls the water flowing from the spout 20 by being electrically connected with a controlling mechanism housed in the casing 22. This control device is also connected with the motor 16 so that variations in the load on the motor 16 will proportionately vary the amount of water flowing from the spout 20 by means of the magnetic valve 21. The amount of water flowing from the spout 20 of course governs the consistency of the rouge on the surface of the glass on the platens 12 thereby controlling the work done on the glass beneath each head, that is, we have provided means for increasing the supply of water to the rouge on the surface of the glass when the load on the unit driving mechanism becomes heavier, and means for cutting off the supply of water when the load on the unit driving mechanism becomes lighter, with the result that the increased supply of water thins the rouge thereby decreasing the proportionate action of the head on the glass, while cutting off the supply of water thickens the rouge proportionately thereby increasing the effect of the polishing head on the glass proportionately. By this means we are enabled to maintain the load on each polishing head substantially uniform thereby securing, as has been before indicated, glass of substantially uniform quality in substantially maximum amounts in proportion to the equipment used, and with a minimum amount of breakage.

Figure 3:
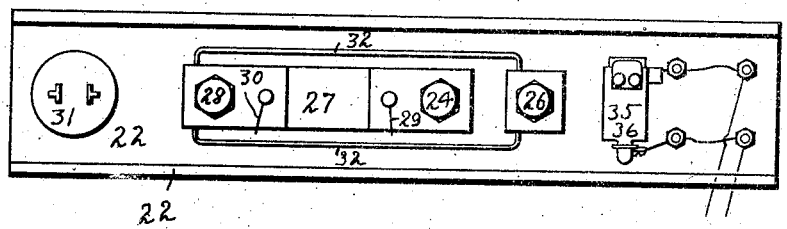
Figure 3 shows a top or plan view of our improved regulating device and casing therefor, the cover being removed.
Figure 4:
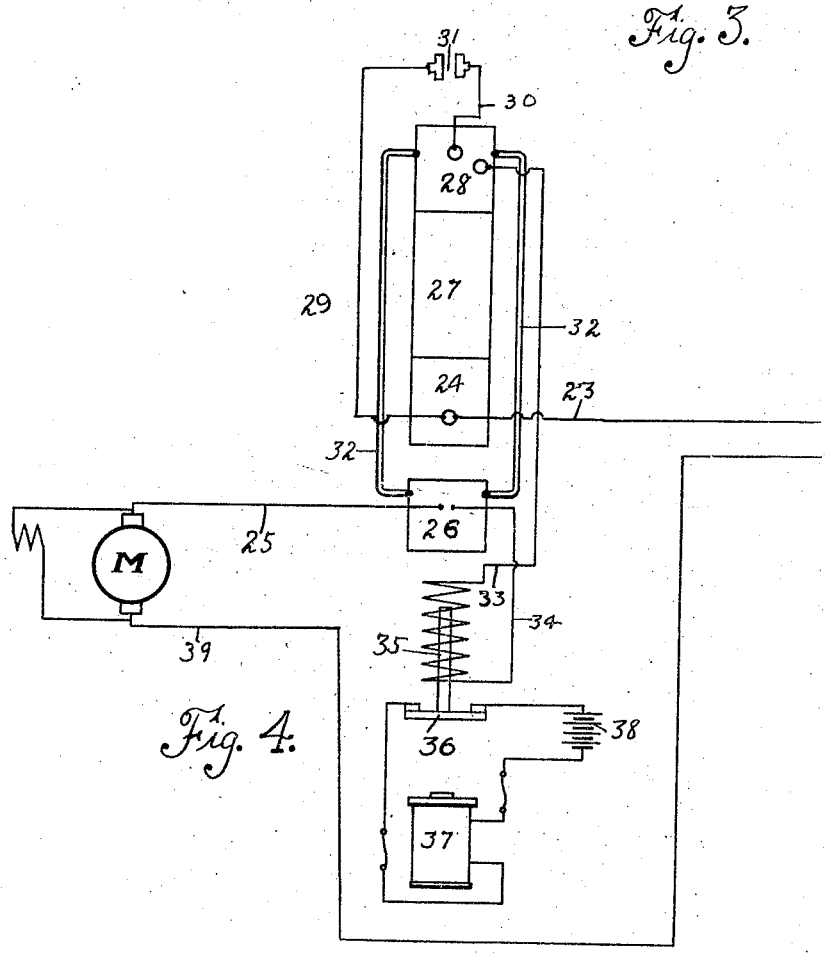
Figure 4 shows a diagrammatic view of the electrical connections in connection with our improved device.

The regulating device used in connection with our invention is illustrated by the enlarged detail view shown in Figure 3, and the wiring used is illustrated in the diagram, Figure 4. In this connection it will be understood that this device here illustrated is cut into the motor supply circuit by connecting one wire 23, from any suitable source of current, with the screw 24. The current is carried away from the device and on over to the motor 16 by a wire 25 which is connected to the screw 26. The current received from the wire 23 at the terminal 24 is conducted across a current carrying element 27 of known resistance, to a terminal 28. A shunt circuit is carried around the resistance element 27 by means of wires 29 and 30 which are connected to the terminals 24 and 28 respectively, and connected to a socket 31, so that by plugging into the socket 31 with an ammeter, voltmeter, or other instrument the quantity or quality of the current passing thru the resistance element 27 may be determined. This enables an operator to determine the current used by the motor 16 thereby enabling the operator to adjust that current to cause the motor to drive the polishing pads with a pre-determined energy thereby giving a pre-determined finish on the glass. Extending from the terminal 28 to the terminal 26 are one or more resistance elements 32 of what are termed the "hot wire" type—that is, these resistance elements 32 are so arranged and of such material that an increase in the current carried by these elements results in heating the elements thereby largely increasing their resistance whenever an overload or extra heavy current is passed therethru. The terminals 26 and 28 are also connected by a shunt circuit comprising the wires 33 and 34 which terminate in a relay 35. This relay 35 operates an armature switch 36 which closes a circuit thru the coil 37 whenever the current passing thru the relay 35 reaches a pre-determined amount. The relay circuit thru the coil 37 is connected to any suitable source of power, as to a battery 38. A return wire 39 for the motor 16 completes the circuit for the motor 16. to the source of electrical energy designed to drive the motor.

Figures 5, 6:
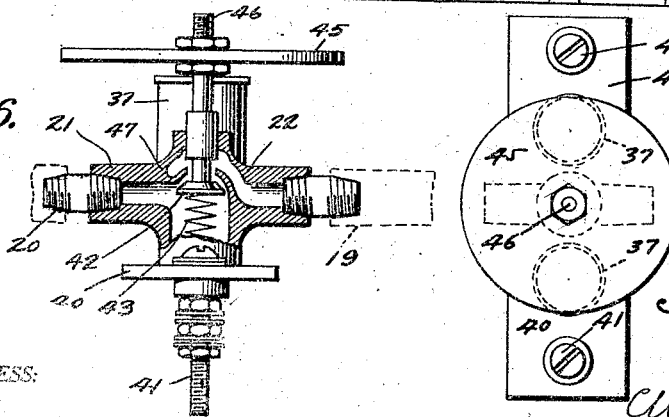
Figure 5 shows a top or plan view of the magnetic valve used in connection with our device.
Figure 6 shows a side elevation of said valve, parts being broken away to better illustrate the construction thereof.

The coil 37 operates the magnetic valve device illustrated in Figures 5 and 6. In these figures a frame or support 40 carries a pair of the magnets 37 held in spaced relation and also carries binding posts 41 which may be connected with the relay 35 by any suitable wiring. A normally closed valve 42 with a spring 43 permits a current of water or other fluid to pass thru the valve housing 44 which in turn is connected to the feed line 19. An armature 45 which is circular, in the form here shown, is attached to the valve stem 46 of the valve 42 above the magnets 37 so that when circuit is closed thru these magnets then the valve 43 will be opened to permit water to pass thru the valve housing 44 as the magnets 37 will draw the armature down thereby opening the valve.

In the practical operation of our improved device, it will be apparent that the device, generally speaking, is inserted in a motor current feed line so that the motor current coming in thru the wire 23 will pass from the terminal 24 to the terminal 28 normally by means of the resistance element 27. When, however, an ammeter or other electrical measuring instrument is plugged into the plug 31 then the current will divide and pass thru the wires 29 and 30 and the resistance element 27 inversely in proportion to their respective resistances, thereby enabling a very fine reading on the current recording instrument of the current being used for running the motor 16. The current reaching the terminal 28 then may pass along the hot wire resistance 32 to the terminal 26 and may pass thru the coil of the relay 35 to the terminal 26; from the terminal 26 the current passes on to the wire 25 to the motor 16. It will readily be seen that the current passing thru the coil of the relay 35 and the current passing thru the hot wires 32 will be inversely proportional to their resistances. By the use of these hot wires 32 we are, therefore, enabled to use a relatively small relay for closing the armature switch 36, and in some of the models which we have made we have used an ordinary cutout for a generator of an automobile for the relay and arranged it to close the magnetic valve circuit at about from ten to twelve amperes. It will be understood that the spring tension on the relay may be adjusted thereby regulating the resistance of the relay armature to the magnetic pull of the relay coil which will result in enabling the operator to determine to a very fine degree the current supplied to the motors which will actuate the relays to close the relay circuits. The hot wires 32 which we have used so far have been of such size and resistance that the current load of the motor at normal speeds or loads would pass thru the hot wires 32 without heating same. When, however, the current increases somewhat due to the increased load on the polishing units then the increased current passing thru the hot wires will cause them to heat quickly thereby increasing their resistance at a very rapid rate. On the other hand, the relay resistance will remain substantially uniform so that the current passing therethru will be very largely increased proportionately, which in turn actuates the relay to in turn actuate the magnetic valve thereby causing an additional supply of water to be fed to the rouge on the glass which is being polished. This water or dilution of the rouge almost immediately lightens the load on the polishing unit so that the current passing to the motor will be less and the hot wires 32 will be allowed to cool. It will be seen that by the use of these hot wires composed of carefully graduated nichrome or other metal of similar properties, we are enabled to largely increase the sensitiveness of the relay used for closing the magnetic valve circuit and at the same time we are enabled to use a very small relay device so that our entire regulator with the exception of the battery and the magnetic valve for the water supply may be housed in a very small casing 22, which, in the form actually used, is less than three inches across and twelve inches long. On the other hand, this comparatively small and inexpensive regulator has very largely reduced our breakage since it was installed besides appreciably increasing the quality and quantity of the glass produced.

Among the many advantages arising from the use of our improved device, of course the outstanding feature is the largely increased production due to the cutting down of the breakage of the glass without material increase in the cost of production. We are also enabled to run our polishing devices somewhat more rapidly because the full efficiency of each polishing head is used and the glass resulting is of somewhat finer finish due to the more uniform operation of the automatic regulators. In the operation of the various polishers relative to the regulator itself, it will readily be seen that it occupies little room, is comparatively cheap, and inexpensive for installation, and may be readily made adjustable to various current loads for the motor 16, by simply loosening the screws 26 and sliding the hot wires 32 in and out from the terminals in which the screws 26 and 28 are set, thereby varying their effective resistances. The compactness of the device is largely increased by the use of the combined hot wire and relay structure, and the sensitiveness thereof has also largely increased.

It may be mentioned in passing, however, that it has heretofore been tried to have manually operated devices for accomplishing the result accomplished by our automatic device but that the manual control was wholly unsatisfactory in that the expense of an operator to each head of a battery would be entirely out of the question, and yet where one operator attempted to attend to the supply of rouge for several heads, apparently, such operator was wholly unable to attain a uniform fluidity of the rouge to thereby eliminate breakage.

Our invention has been described herein as applied wholly to glass grinding or polishing machinery and is shown and described more particularly in connection with the polishing machinery. On the other hand, it will be readily apparent that such a regulator and principle in regulating may be largely used in connection with other forms of grinding and polishing such, for instance, as marble or slate, and that the usefulness of the regulator proper need not necessarily be confined to glass machinery.

It will be apparent that while we have herein shown a pair of hot wires 32 for one of the circuits between the contacts 26 and 28, yet other resistances of a similar character may be used instead of the hot wires where such current carrying devices will permit a predetermined amount of current to flow therethru with a relatively slight resistance, but the resistance will increase more rapidly in proportion when an increased current is forced thru such devices whereby the operation of the relay 35 may be more sensitive to current changes between the contacts 26 and 28. It will also be understood hat where we have referred to "hot wire devices" in the specification or claims that we mean to include thereby the equivalent and functions of a hot wire.

Some changes may be made in the arrangement and construction of the various parts of our improved device without departing from the spirit of the invention therein and it is our intention to cover by our claims such changes as may be reasonably included within the scope thereof.

We claim as our invention:

1. In a device of the class described including a work carrying table, an abrading device associated therewith, electrical means for driving the abrading devices, means for feeding an abrasive substance to the work on the table, and means included in the driving device circuit for automatically varying the abrasive substance supplied in proportion to the current passing through said circuit whereby the efficiency of the abrading device may be maintained to a substantially constant pre-determined amount.

2. In a device of the class described, including a work carrying table, an abrading device associated therewith, electric means for driving the abrading device, an abrasive substance associated with the table and abrading device, means for varying the quality of said abrasive substance, and means included in the driving circuit for automatically operating said last described means in proportion to the current passing through said circuit whereby the efficiency of the abrading device may be maintained substantially constant.

Dated February 17, 1922.

CLARENCE W. AVERY.
WENZEL G. VESEY.